(12) United States Patent
Beyer, Jr.

(10) Patent No.: US 7,853,273 B2
(45) Date of Patent: Dec. 14, 2010

(54) METHOD OF CONTROLLING USER AND REMOTE CELL PHONE TRANSMISSIONS AND DISPLAYS

(76) Inventor: Malcolm K. Beyer, Jr., 92 Lighthouse Dr., Jupiter Inlet Colony, FL (US) 33469-3504

( * ) Notice: Subject to any disclaimer, the term of this patent is extended or adjusted under 35 U.S.C. 154(b) by 924 days.

(21) Appl. No.: 11/612,830

(22) Filed: Dec. 19, 2006

(65) Prior Publication Data

US 2008/0076410 A1 Mar. 27, 2008

Related U.S. Application Data

(63) Continuation-in-part of application No. 11/308,648, filed on Apr. 17, 2006, which is a continuation-in-part of application No. 10/711,490, filed on Sep. 21, 2004, now Pat. No. 7,031,728.

(51) Int. Cl.
*H04W 24/00* (2009.01)

(52) U.S. Cl. .................. 455/457; 455/425; 455/466
(58) Field of Classification Search ............... 455/457
See application file for complete search history.

(56) References Cited

U.S. PATENT DOCUMENTS

2002/0107008 A1* 8/2002 Hendrey et al. ............. 455/416
2004/0192331 A1* 9/2004 Gorday et al. ........... 455/456.1

* cited by examiner

*Primary Examiner*—Nick Corsaro
*Assistant Examiner*—Amanuel Lebassi
(74) *Attorney, Agent, or Firm*—Malin Haley DiMaggio Bowen & Lhota, P.A.

(57) ABSTRACT

A method, a combined cellular, PDA communication device, and a system having specialized software applications for allowing a plurality of combined cellular phone/PDA device users to monitor each others' locations and status, to initiate cellular phone calls by touching a symbol on the touch screen display with a stylus which can also include point to call conferencing calling. Each participant's cellular phone/PDA device includes a GPS navigation receiver with application software for point to call cellular phone initiation to participants and geographical entities including vehicles, persons or events, conference calls and video transfers. The method, device and system also includes several features that allow each individual cell phone/PDA device user to: a) transmit and remotely control one or more other participants' cell phones; b) allow a user to stop sending or transmitting digital messages or messages from an individual user phone; c) provide the individual user with a soft switch that causes destruction of the user's display and/or message location processing software in the user's cell phone while turning off the speaker and activating a microphone so that conversations near the user's cell phone can be monitored; and d) transmit and destroy a remote phone's location display and/or message location processing software while turning off the remote phone speaker and activating the remote phone microphone so that conversations near the remote phone can be monitored.

4 Claims, 7 Drawing Sheets

METHOD OF CONTROLLING USER AND REMOTE CELL PHONE TRANSMISSIONS AND DISPLAYS

This application is a continuation-in-part of U.S. patent application Ser. No. 11/308,648 filed Apr. 17, 2006 which is a continuation-in-part of U.S. patent application Ser. No. 10/711,490 now U.S. Pat. No. 7,031,728.

BACKGROUND OF THE INVENTION

1. Field of the Invention

A communications system using a plurality of cellular phones each having an integrated PDA and GPS receiver for the coordination of two or more people through the use of a communications network. The method and system provide each user with an integrated handheld cellular/PDA/GPS/ phone that has advanced communication software application programs (hereinafter referred to as ACS) and databases used in conjunction with a remote server that enable a user to control the user's cell phone and to remotely control other users' cellular/PDA phones to create a passive mode and partial shutdown.

2. Description of Related Art

The purpose of a communications system is to transmit information bearing digital messages from a source, located at one point, to a user destination, located at another point some distance away. A communications system is generally comprised of three basic elements: transmitter, information channel and receiver. One form of communication in recent years is cellular phone telephony. A network of cellular communication systems set up around an area such as the United States allows multiple users to talk to each other, either on individual calls or on group calls. Some cellular phone services enable a cellular phone to engage in conference calls with a small number of users. Furthermore, cellular conference calls can be established through 800 number services. Cellular telephony also now includes systems that include Global Positioning System (GPS) navigation that utilizes satellite navigation. These devices thus unite cellular phone technology with navigation information, computer information transmission and receipt of data.

The method and operation of the communication devices (cell phone/PDA/GPS with touch screen) used herein are described in U.S. Pat. No. 7,031,728 which is hereby incorporated by reference and pending U.S. patent application Ser. No. 11/308,648 and are usually discussed herein as a cell phone.

It is desirable in certain specific communication networks such as military or police to: (a) enable each network participant having a cell phone that provides other participants with ongoing information such as location to stop reporting and transmitting to other participants messages and to go into a listen only passive mode for transmission silence and (b) provide each cell phone the ability to quickly destroy its message location processing and/or display software in case of capture. Furthermore, it is desirable for a commander's cell phone to be able to remotely control one or more of the cell phones operating in the entire network to: (a) cause another busy phone to interrupt and to accept a voice call, (b) force a phone to accept an incoming call, and (c) quickly disable or destroy a remote phone's message location processing and/or display software in case of capture.

SUMMARY OF THE INVENTION

Applicant's communication system and method described herein is embodied in the advanced communication software (ACS) application programs developed by applicant and installed in the integrated PDA/GPS cell phones used herein.

A plurality of cellular phone/PDA/GPS devices each having ACS application programs and databases provide a communication network in conjunction with a remote server dedicated to the communication network of cell phone devices with the ability to: a) selectively poll each of the other PDA/ GPS cell phone devices requiring each participant phone to start automatically reporting its position and status information to all or selected users equipped with the same cellular phone/PDA software devices in the communications net so that each of the phone devices exchange location, status and other information, (b) remotely control from one cellular phone/PDA/GPS any of the other cellular phone/PDA/GPS systems phones including the ability to control remote cellular phones, place return calls, place calls to another phone number, vibrate, execute text to speech software, change sound intensity, and remotely control software and functions resident on the remote phones, (c) display remote phone information by touching the user phone display screen depicting remote phone's location on the PDA user display, (d) make calls to or send data to remote phones by touching their display symbols and selecting the appropriate user phone displayed soft switch; (e) layer a sufficient number of switches or buttons on the PDA display to perform the above functions without overlaying the map; and (f) change the nomenclature of a series of soft switches for different operating environments.

A communication network server acts as a forwarder for IP communications between any combination of cell phone/ PDA users and/or PC based users. Network participant location, identity and status messages are sent to the server by each network participant or user phone device. Network participant entered tracks are also sent to the server. Because this data is of interest to all the network participants, the server forwards the data received from one participant to all other participants, thus providing the information necessary for all network participants to know the identity, location and status of all other network participants.

The server also acts as a forwarder of data addressed from one participant to one or more addressed participants, thus permitting the transmission of free text, preformatted messages, photographs, video, E-mail and URL data from one network participant to other selected network participants.

The above functions can also be accomplished using peer to peer WiFi, WiMax or other peer to peer communications. However, for use with cellular communications and to assure the level of security that cell phone companies require, a centralized static IP routable server is used.

The IP server also fills another role of being a database from which data can be requested by network participants (i.e. maps, satellite images, etc.) or can be pushed to network participants (i.e. symbology and soft switch changes, etc.).

It is an object of this invention is to enable each participant in the communications net to poll the other net participants to report or cease reporting their locations, identity and status on the communication net.

It is another object of this invention to provide and enable each participant in the communications net to select an ACS software switch that directs each participant's cell phone software to limit the application to receive messages only at the cell phone thus making it passive.

Another object of the invention is to provide a communication system having a plurality of individual cell phones that allow an operator of one cell phone to remotely control any of the other cell phone/PDA system phones including the ability to: (a) control remote cellular phones that cause another phone to automatically accept a voice call, (b) select a soft switch that destroys the message location processing software of the remote phone and to activate a microphone so conversations can be monitored, (c) remotely turn off and turn on the specific message location processing and/or display software in the remote phone and (d) remotely cause a cell phone to destroy its message location processing and display software.

In accordance with these and other objects which will become apparent hereinafter, the instant invention will now be described with particular reference to the accompanying drawings.

PREFERRED EMBODIMENT OF THE INVENTION

A method and communication system that joins participants in a communications network using handheld cell phones having integrated PDA and GPS circuitry with ACS application programs that allow a participant having an Advanced Commutations Software (ACS) equipped cell phone to activate and control other participants' remote cell phones/PDAs that contain ACS.

Each cell phone described herein for the participant network has its own individual on/off power and can function just as any other cell phone. It can also function with its PDA and GPS system. In addition to its own on and off power switch, it has another switch that activates the ACS advanced communication software programs resident in each cell phone including the special databases that provide all the other participants' telephone numbers, E-mail addresses and other information necessary to carry on the communications described herein. To operate the network, obviously the cell phone power switch has to be on. If the cell phone is completely turned off, then it is not part of the participating network.

The communication system includes a server that acts as a forwarder for IP communications between any combination of cell phone/PDA users and/or PC based users. Network participant location, identity and status messages are sent to the server by each user. The users are the network participants. Network participant entered tracks are also sent to the server. Because this data is of interest to all the network participants, the server forwards the data received from one participant to all other participants, thus providing the information necessary for all network participants to know the identity, location and status of all other network participants.

The server also acts as a forwarder of data addressed from one participant to one or more addressed participants, thus permitting the transmission of free text preformatted messages, photographs, video, E-mail and URL data from one network participant to other selected network participants.

The above functions can also be accomplished using peer to peer WiFi, WiMax or other peer to peer communications. However, for use with cellular communications and to assure the level of security that cell phone companies require, a centralized static IP routable server is used.

The IP server also fills another role of being a database from which data can be requested by network participants (i.e. maps, satellite images, etc.) or can be pushed to network participants (i.e. symbology and soft switch changes, etc.).

Figure 1A:
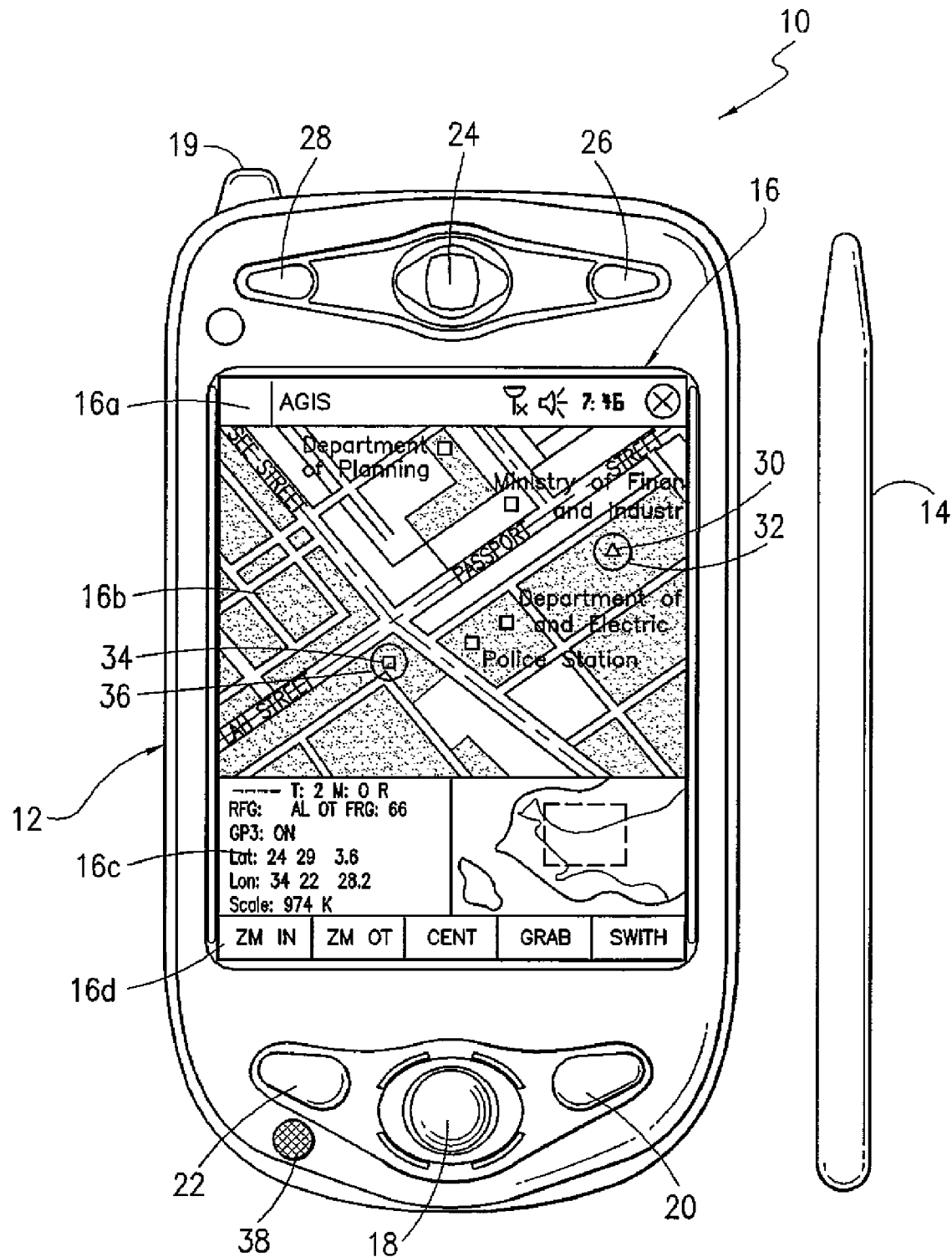
FIG. 1a shows a front plan view of a cellular phone/PDA/GPS having a touch screen that includes ACS software described herein.

Referring now to the drawings and, in particular, FIG. 1a, a small handheld cellular phone 10 is shown that includes a personal digital assistant (PDA) and a global positioning system receiver (GPS) communications device integrated in housing 12 that includes an on/off power switch 19, a microphone 38, and an LCD display 16 that is also a touch screen system. The small area 16a is the navigation bar that depicts the telephone, GPS and other status data and the active software. Each cell phone includes a CPU and databases that store information useful in the communication network. The CPU also includes a symbol generator for creating touch screen display symbols discussed herein. With the touch screen 16, the screen symbols are entered through GPS inputs or by the operator using a stylus 14 (or operator finger) by manipulatively directing the stylus 14 to literally touch display 16. The soft switches 6d displayed on the display 16 are likewise activated by using a stylus 14 and physically and manipulatively directing the stylus to literally touch display 16. The display x, y coordinates of the touched point are known by a CPU in the PDA section of the communication system in housing 12 that can coordinate various information contained in the PDA relative to the x, y coordinate position on the display 16. Inside housing 12 is contained the conventional cellular phone elements including a modem, a CPU for use with a PDA and associated circuitry connected to speaker 24 and microphone 38. A GPS navigational receiver that receives signals from satellites that can determine the latitude and longitude of the cellular phone housing 12 can be internal or external to the housing 12. Conventional PDA/cellular phones are currently on sale and sold as a unit (or with an external connected GPS) that can be used for cellular telephone calls and sending cellular SMS and TCP/IP or other messages using the PDA's display 16 and computer (CPU). The GPS system including a receiver in housing 12 is capable of determining the latitude and longitude and through SMS, TCP/IP, WiFi or other digital messaging software, to also transmit this latitude and longitude information of housing 12 to other cellular phones in the communication network via cellular communications, WiFi or radio. The device 10 includes a pair of cellular phone hardware activating buttons 20 to turn the cellular phone on and 22 to turn the cellular phone off. Navigation pad actuator 18 is similar to a joy or force stick in that the actuator 18 manually provides movement commands that can be used by the PDA's software to move a cursor on display 16. Switches 26 and 28 are designed to quickly select an operator specified network software program. Speaker 24 and microphone 38 are used for audio messages. Switch 19 at the top left of device 10 is the power on and power off switch for the entire device.

The heart of the invention lies in the applicant's ACS application programs provided in each cell phone/PDA device. The ACS programs are activated by clicking on an icon on the cell phone/PDA display screen to turn the ACS programs on or off. Mounted within housing 12 as part of the PDA is the display 16 and the CPU (not shown). The internal CPU includes databases and software application programs that provide for a geographical map and georeferenced entities that are shown as display portion 16b that includes as part of the display various areas of interest in the particular local map section.

When looking at display 16, the software switches (soft switches) which appear at the very bottom of the display 16d are used to control by touch many of the software driven functions of the cellular phone and PDA. The soft switches are activated through the operator's use of the navigation pad 18, or a small track ball, force stick or similar hardware display cursor pointing device. Alternatively, the operator may choose to activate the software switches by touching the screen with a stylus 14 (or finger) at the switches' 16d locations. When some of the software switches are activated, different software switches appear. The bar display 16d shows the software switches "ZM IN (zoom in)," "ZM OT (zoom out)," "CENT (center)" and "GRAB (pan/grab)" at the bottom of the screen. These software switches enable the operator to perform these functions. The "SWITH (switch)" software switch at the lower right causes a matrix of layered software switches (soft switches) to appear above the bottom row of switches. Through use of the software switches, the operator can also manipulate the geographical map 16b or chart display. When looking at FIG. 1a, display symbols depict permanent geographical locations and buildings are shown. For example, the police station is shown and, when the symbol is touched by the stylus or finger, the latitude and longitude of the symbol's location, as shown in display section 16c, is displayed at the bottom left of the screen. The bottom right side of display 16c is a multifunction inset area that can contain a variety of information including: a) a list of the communication link participants; b) a list of received messages; c) a map, aerial photograph or satellite image with an indication of the zoom and offset location of the main map display, which is indicated by a square that depicts the area actually displayed in the main geographical screen 16b; d) applicable status information; and e) a list of the communication net participants. Each participant user would have a device 10 shown in FIG. 1a.

Also shown on the display screen 16, specifically the geographical display 16b, is a pair of different looking symbols 30 and 34, a small triangle and a small square, which are not labeled. These symbols 30 and 34 can represent communication net participants having cellular phones in the displayed geographical area that are part of the overall cellular phone communications net, each participant having the same device 10 used. The latitude and longitude of symbol 30 is associated within a database with a specific cell phone number and, if available, its IP address and E-mail address. The screen display 16b, which is a touch screen, provides x and y coordinates of the screen 16b to the CPU's software from a map in a geographical database. The software has an algorithm that relates the x and y coordinates to latitude and longitude and can access a communications net participant's symbol or a fixed or movable entity's symbol as being the one closest to that point.

In order to initiate a telephone call to the cellular phone user (communication net participant) represented by symbol (triangle) 30 at a specific latitude and longitude displayed on chart 16b, the operator touches the triangle 30 symbol with the stylus 14. The operator then touches a "call" software switch from a matrix of displayed soft switches that would overlay the display area 16c. Immediately, the cellular phone will initiate a cellular telephone call to the cellular phone user at the geographical location shown that represents symbol 30. A second cellular phone user (communication net participant) is represented by symbol 34 which is a small square (but could be any shape or icon) to represent an individual cellular phone device in the display area. The ring 32 around symbol 30 indicates that the symbol 30 has been touched and that a telephone call can be initiated by touching the soft switch that says "call." When this is done, the telephone call is initiated. Other types of symbolic elements on the display 16 can indicate that a cellular phone call is in effect. Additionally, the operator can touch both symbol 34 and symbol 30 and can activate a conference call between the two cellular phones and users represented by symbols 30 and 34. Again, a symbolic ring around symbol 34 indicates that a call has been initiated.

Equally important, an operator/user with a cell phone call the police station or any other specific geographical facility displayed on the cell display map, including: buildings, locations of people, vehicles, facilities, restaurants, and the like, whose cellular phone numbers and, if available, E-mail addresses, IP addresses and their URLs are previously stored in the database, by touching a specific facility location on the map display using the stylus 14 and then touching the cellular phone call switch. As an example, the operator/user can touch and point to call a restaurant using a soft switch by touching the restaurant location on the display with a stylus and then touching the call soft switch. The cellular phone will then call the restaurant. Thus, using the present invention, each participant can touch and point to call to one or more other net participants symbolically displayed on the map, each of whom has a device as shown in FIG. 1a and can also point to call facilities and regular phone numbers that had been previously stored in the phone's database. Furthermore, this symbol hooking and soft switch technique can be used to go to a fixed facility's website or to automatically enter the fixed facility's E-mail address in an e-mail.

Each cellular phone/PDA/GPS user device is identified on the map display of the other participants users' phone devices by a display symbol that is generated on each user phone display to indicate each user's identity. Each symbol is placed at the correct geographical location on the user display and is correlated with the map on the display. The operator of each cellular phone/PDA/GPS device may also enter one or more other fixed entities (buildings, facilities, restaurants, police stations, etc.) and geo-referenced events such as fires, accidents, or other events into its database. This information can be likewise transmitted to all the other participants on the communications net. The map, fixed entities, events and cellular phone/PDA/GPS device communication net participants' latitude and longitude information is related to the "x" and "y" location on the touch screen display map by a mathematical correlation algorithm.

When the cellular phone/PDA/GPS device user uses a stylus or finger to touch one or more of the symbols or a location displayed on the cellular phone map display, the system's software causes the status and latitude and longitude information concerning that symbol or location to be displayed. In order to hook a symbol or "track" such as another net participant which represents an entity on the geo-referenced map display, or a fixed geographical entity such as a restaurant, police station or a new entity observed by a cell phone user which is discussed below, the operator points at or near the location of a geo-referenced symbol appearing on the cellular phone/PDA display that represents a specific track or specific participant or other entity. The hook application software determines that the stylus is pointed close to or at the location of the symbol and puts a circle, square or other indication around the symbol indicating that amplification information concerning the symbol is to be displayed and indicating that additional data or change in data can be made to the indicated symbol. The hook application code then sends a message to the display application code to display the net participant, facility or entity's amplifying data. The display application code retrieves the primary data and amplification data concerning the symbol or entity from the database and displays the information at the correct screen location. The operator can then read the amplification data that relates to that specific symbol at the specific location. The cell phone operator can also select soft switches on the touch screen display to change the primary data and amplification data. Furthermore, the operator can use a similar method of hooking and selecting to activate particular soft switches to take other actions which could include: making cellular phone calls, conference calls, 800 number calls; sending a free text message, operator selected preformatted messages, photographs or videos to the hooked symbol; or to drop a entered symbol.

Each known net participant has a cellular phone number, IP address and, if available, E-mail address that is stored in each participant's device database.

To use the communication system, the operator starts the PDA/cellular phone device system by selecting the cell phone and ACS network software which causes: a) the cellular phone to be activated (if it has not already been activated); b) the GPS interface receiver to be established; c) a map of the geographic area where the operator is located and operator's own unit symbol to appear at the correct latitude and longitude on the map on the display; d) the locations of fixed facilities such as restaurants, hotels, fire departments, police stations, and military barracks, that are part of the database to appear as symbols on the map; e) the device selected item read out area which provides amplification information for the communications net participants or the entity that has been hooked (on the display screen) to appear on the display; f) an insert area that contains various data including: the list of net participants, a list of messages to be read, an indication of what portion of the map is being displayed in major map area and other information to appear on the display; and g) a row of primary software created "soft switches" that are always present on the display to appear.

For point to call network units and fixed facilities, the application code detects the x, y display screen location of the symbol that is designated by the user's stylus and translates the x, y coordinates to latitude and longitude and then: (1) searches the database to find the symbol at that location, (2) places a "hook" indicator (a circle, square or other shape) around the symbol, (3) displays any amplifying data and (4) obtains the symbol's associated phone number (or for VoIP calls an IP address) from the database. Upon receiving a "call" designation from the soft switch, the operator's device's ACS causes the appropriate phone number or IP number to be called. Upon receiving an indication that the phone number is being called, the application code places a box around the symbol (color, dashed or the like). When the call is connected, the box changes to indicate that the connection is made. When the other party hangs up, the box disappears.

As each of the cell phone participants reports its identity, location and status to the other participants' devices, the received data is geo-referenced and filed in their databases that are accessible by identity and by location. This data is then displayed on each cell phone display. When a request for data is received by touching the display screen, a location search is made by the ACS and a symbol modifier (circle, square, etc.) is generated around the symbol closest to the x, y position of the stylus. When the application code receives a soft switch command to place a phone call or send data, the software uses the phone number (or IP address) associated with the unit to place the call or to send data.

If a cell phone device receives a digital message that a call is being received, the receiving cell phone's ACS application code places a box or similar object around the transmitter symbol indicating who the call is from. When the call is answered, the application software changes the visual characteristics of the box. In a similar manner, when a phone receives a digital text message, photograph or video, a box appears around the transmitter's symbol indicating the transmitter of the message. The point to call network devices are participants and each one has a similar device with the same software for use as a total participant network. Other situations for calling facilities that are not part of the network are described below.

Thus, the operator device is capable of initiating a cellular phone call by touch only, and initiating conference calls by touching the geo-referenced map symbols. Furthermore, by using a similar symbol touching technique, a cellular phone can send operator selected messages to cause a remote cellular phone to display and optionally announce emergency and other messages and to optionally elicit a response from the remote cellular phone.

All of the user network participants have the same communication cell phone/PDA/GPS device described herein. The method and system include the ability of a specific operator device to provide polling in which other cellular phones, using SMS, internet or WiFi, report periodically based on criteria such as time, speed, distance traveled, or a combination of a time, speed and distance traveled. The operator can manually poll any or all of the cell phone devices that are used by all of the participants in the communication network having the same devices. The receiving cellular phone application code responds to the polling command with the receiving cellular phone's location and status which could include battery level, GPS status, signal strength and entered track data. Optionally, the phone operators can set their phones to report automatically, based on time or distance traveled intervals or another criterion.

The soft switch application software causes a visual display of a matrix such as five across by six up (or another matrix) in which switch names are placed on the cellular/PDA display. The soft switch network application software knows the touch screen location of each of the switches in the matrix and the software routines that will be activated upon touching the switch.

The bottom row of soft switches displayed on the touch screen remains visually fixed. These switches concern the functions that are the most often used. One of the switches causes a matrix of other soft switches to appear above the visually fixed soft switches. These switches are function soft switches, the activation of any one of which causes a different matrix of soft switches to appear, which are known as the action soft switches. When the action soft switches appear, the function soft switch, which caused the action soft switches to appear, itself appears as a label in the lower left (or some other standard location) indicating to the operator the function soft switch that has been selected. When the operator selects an action soft switch, the appropriate application software to accomplish the action is activated.

Upon receiving a soft switch activation message, the ACS accesses the appropriate task execution software which accomplishes the required tasks including: entry of track data, entry of track amplification data, transmission of alpha/numeric messages, photographs, videos, display of messages to be read, selection of map types, placing voice calls, placing conference calls and 800 conference calls, presenting different potential operator selections, control of the display actions, polling network participants, establishing nets of participants (groups) so that communications with all in the group can be accomplished with a single soft switch action, and dropping a previously entered track. By providing a matrix and layers of soft switches which are easily manipulated by a stylus, each cell phone device in the communication network is extremely efficient in accessing and coordinating the appropriate application program for the device to perform.

Figure 1B:
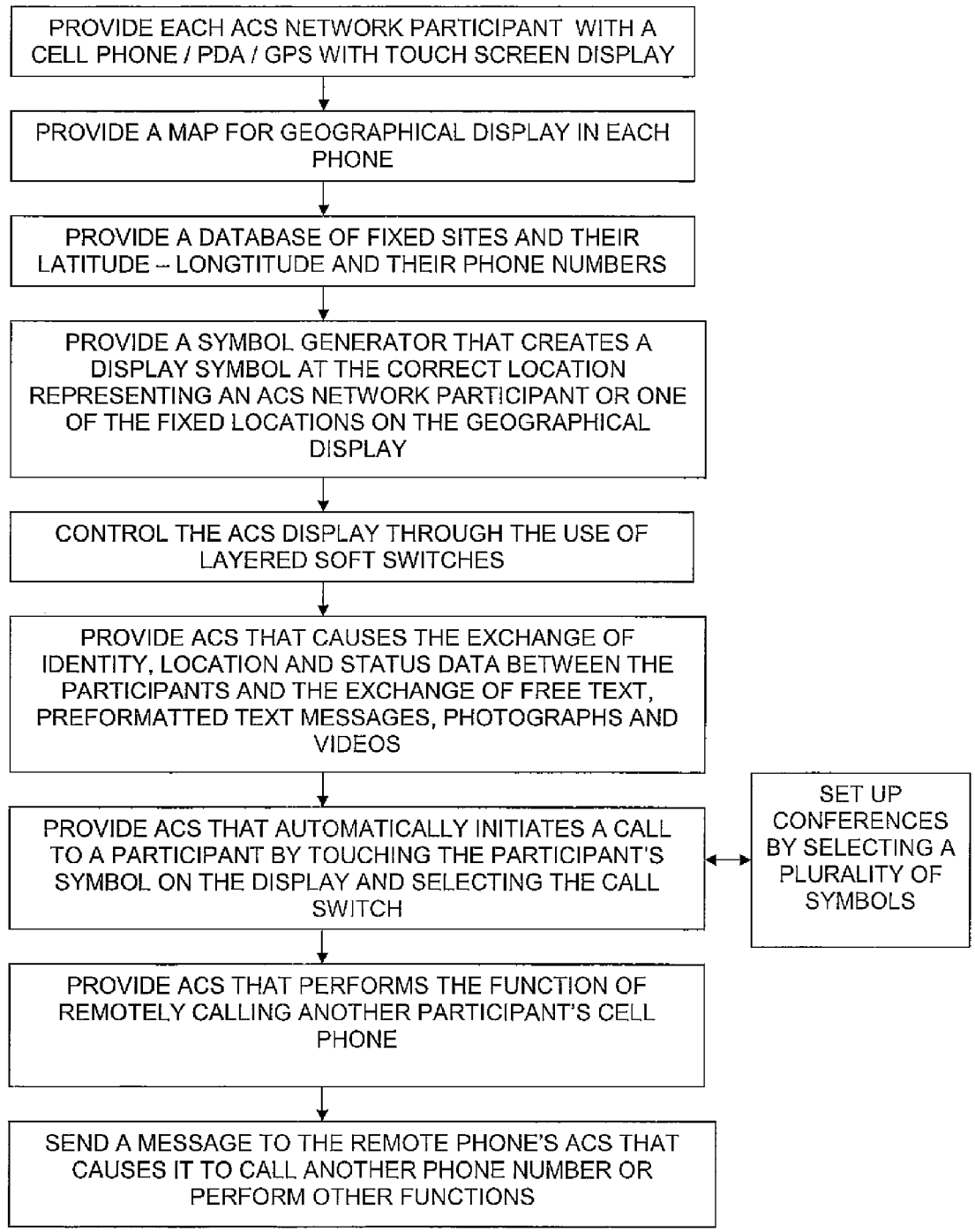
FIG. 1b shows a flow chart that provides a method of calling a remote cell phone by hooking a symbol representing the remote user and selecting the CALL soft switch and causing a remote phone to make a call.

Referring now to FIG. 1b, a flow chart is shown that describes how each user's cell phone/PDA/GPS can be used to remotely control a specific participant's cell phone ACS messaging program and display. Within the communication network of participants, each user has the ability to cause the remote phone(s') ACS program to perform a variety of functions described herein. This is accomplished by having the ACS operate in each user's cell phone/PDA that can identify through the telephone number or IP address, a remote cell phone or group of remote cell phones. These remote phone(s) can be controlled by touching their symbols on the user's screen, then activating the appropriate soft switch which sends a digital message to the remote phone(s) ACS to perform the desired function. Each cell phone has the ability to remotely control from one cellular phone/PDA/GPS any of the other cellular phone/PDA/GPS systems phones including the ability to control remote cellular phones to make verbal prerecorded announcements, place return calls, place calls to another phone number, vibrate, execute text to speech software, change sound intensity, remotely control software and functions resident on the remote phone and process and display information by touching the display screen at their location on the PDA display and selecting the appropriate soft switch; the ability to layer a sufficient number of switches or buttons on the PDA display to perform the above functions without overlaying the map; and the ability to change the nomenclature of a series of soft switches and symbology for different operating environments.

Figure 2A:
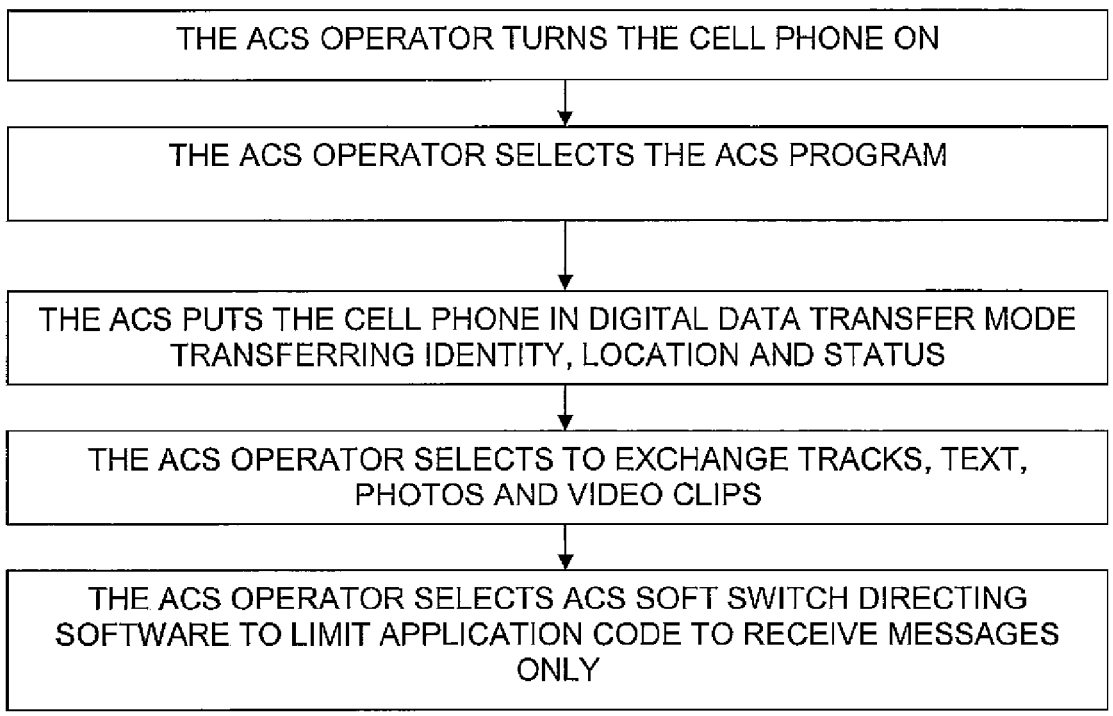
FIG. 2a shows a flow chart that provides a method to the user to preclude the user's own cell phone transmissions.
Figure 2B:
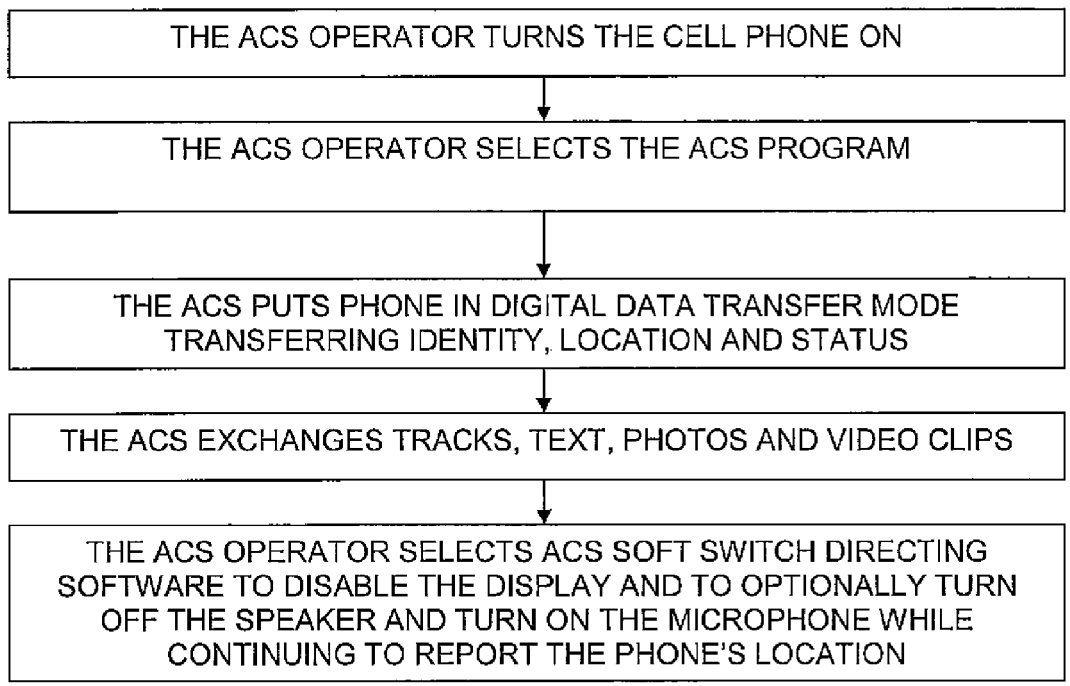
FIG. 2b shows a flow chart of a user method to disable the user's own cell phone message location processing display software.
Figure 2C:
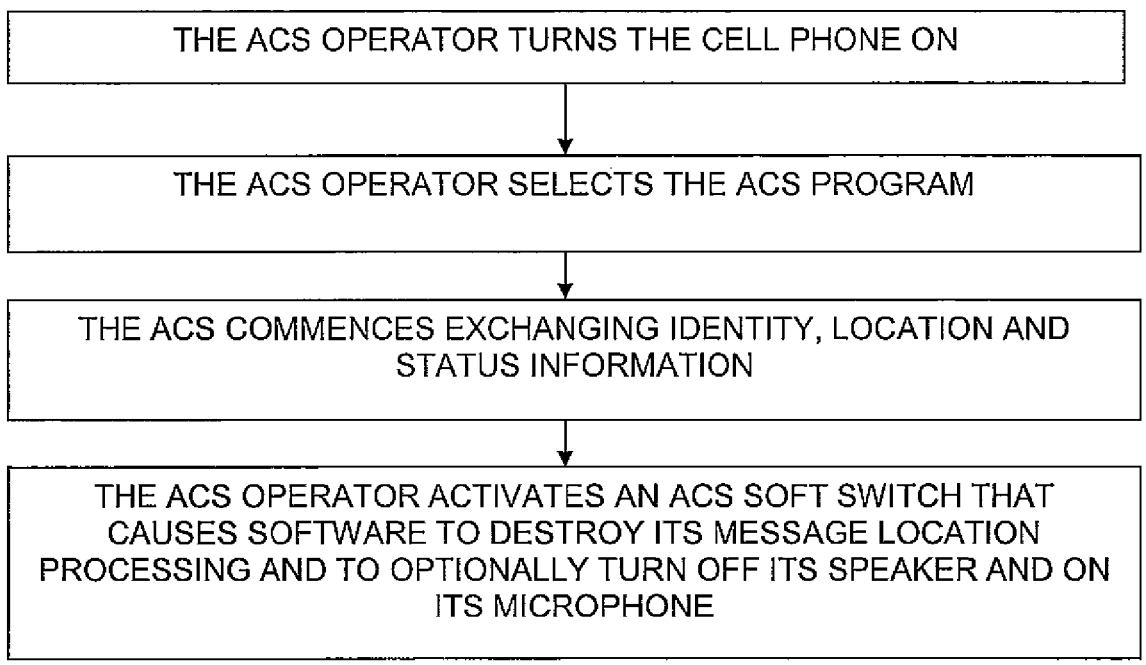
FIG. 2c shows a flow chart showing a user method to destroy the user's own cell phone processing and display software.

Referring now to FIGS. 2a through 2c, each user/participant's cell phone ACS program allows each user to select a soft switch that creates in each user's cell phone the ability to control both the user phone and a remote user's phone's transmission, reception and display of network data. One soft switch, once activated by the user, prevents the user's own cell phone from transmitting any messages. This is important if it is desirous for one or more users to be in a passive mode in an environment where RF transmission could disclose location of the cell phone. Thus, each user can independently select a software program that allows only the receipt of messages. FIG. 2a shows a flow chart that provides a method for the user to preclude the user's own cell phone transmissions. FIG. 2b shows a flow chart of a user method to disable the user's own cell phone display software. FIG. 2c shows a flow chart showing a user method to destroy the user's own cell phone message location processing and display software.

Figure 3A:
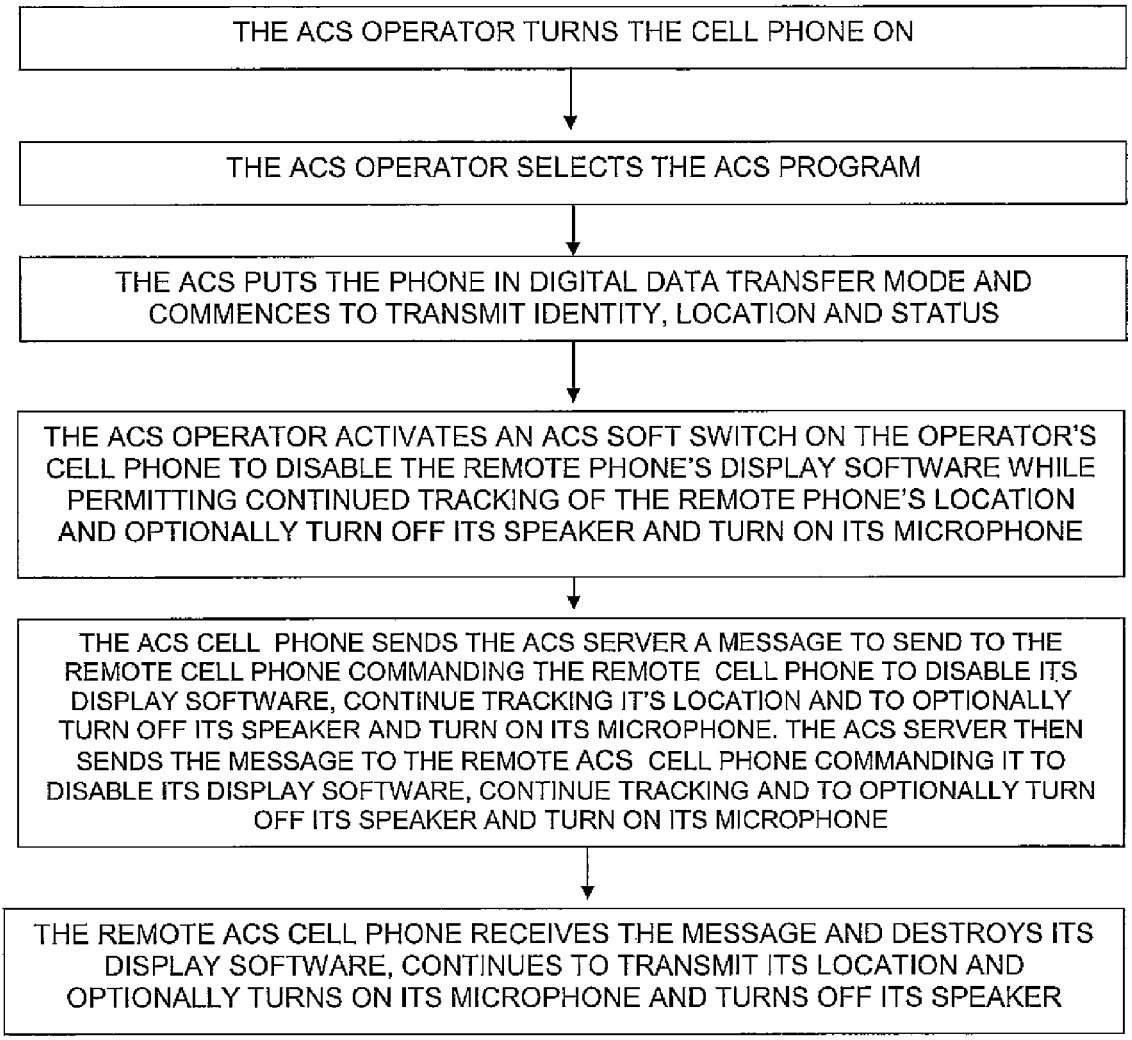
FIG. 3a shows a flow chart of a user method to transmit a digital message to a remote cell phone to turn off the remote cell phone's display.
Figure 3B:
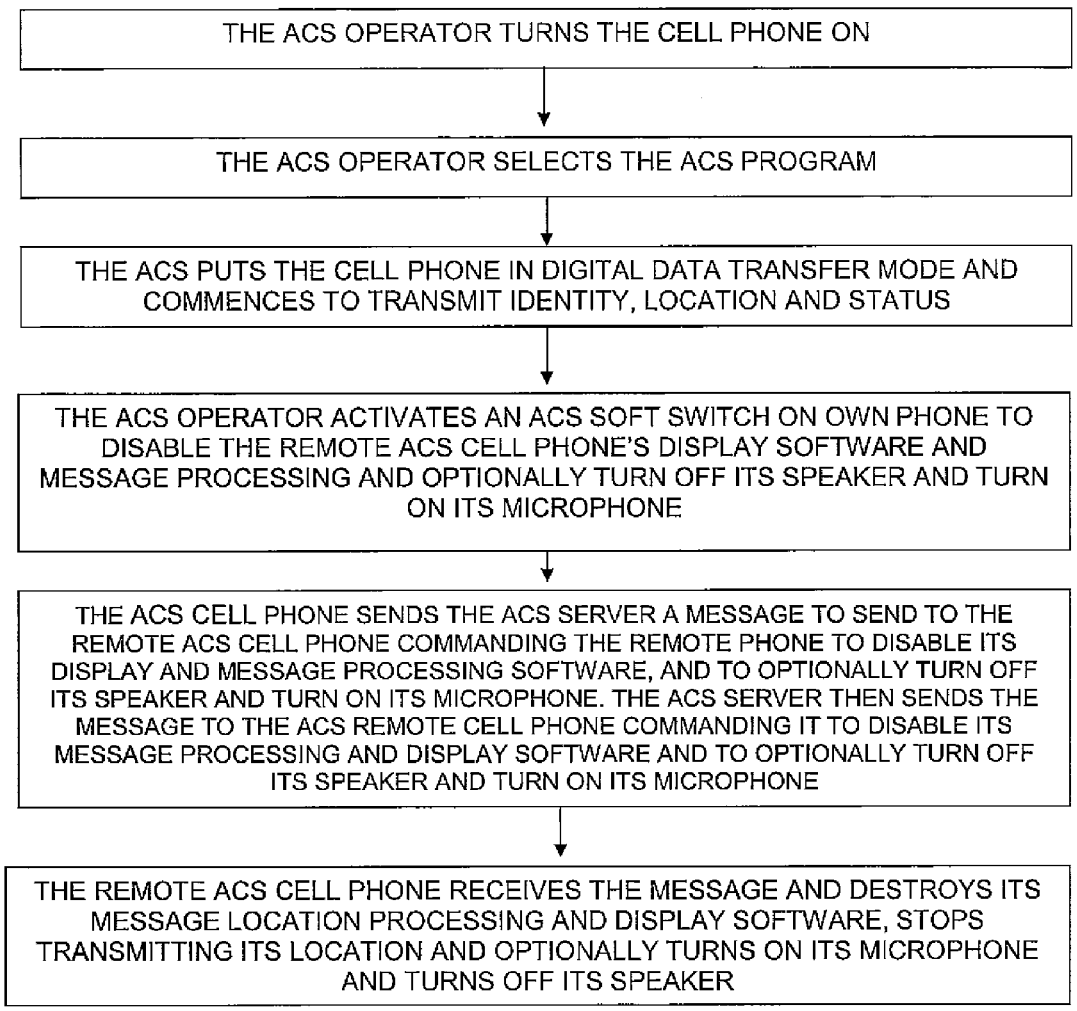
FIG. 3b shows a flow chart of a method for a user cell phone to transmit a digital message to a remote cell phone to destroy the remote cell phone's message location processing and display software.

Referring now to FIGS. 3a and 3b, the ACS program in each cell phone allows each independent cell phone/PDA user to turn off a remote user's ACS phone message location processing and/or display software. Each cell phone has an ACS program connected through a soft switch that can transmit a digital message to remotely turn off a remote user's cell phone ACS message location processing and display software. A user with ACS can send data to a geographically displayed symbol representative of a network participant by touching the participant's symbol and selecting a display screen soft switch that causes a digital message to be sent to that remote network participant. The digital message can then turn off (or on) the remote phone's message processing and/or display software. The remote cell phone power is not turned off. Only the ACS message position processing and display software is turned off.

As depicted in FIG. 3a, a specific user can transmit a digital message to a specifically identified remote network participant's cell phone by touching its symbol on the user's display screen and selecting the appropriate soft switch that makes inoperable (destroys) the remote participant's display but not its position determination software. The user cell phone ACS program can also generate a digital message that selectively turns off the phone's speaker and activates the phone's microphone in the remote participant's cell phone so that any conversations, along with the remote cell phone's location, could be monitored by the user's cell phone. As depicted in FIG. 3b, a specific user can transmit a digital message to a specifically identified remote network participant's cell phone by touching its symbol on the user's display screen that makes inoperable (destroys) the remote participant's display and its message location processing software. The user's cell phone ACS program can also generate a digital message that selectively turns off the phone's speaker and activates a microphone in the remote participant's cell phone so that any conversations could be monitored by the user's cell phone.

To accomplish the above, the ACS cell phone sends the server a message to send to the remote ACS cell phone, commanding the remote cell phone to disable its message location processing and/or its display software and (optionally) to turn off its speaker and turn on its microphone. The server then sends the message to the remote cell phone, commanding it to disable its display software and/or message location processing, and (optionally) to turn off its speaker and turn on its microphone The remote ACS cell phone receives the message and destroys its display software, and the message location processing; and optionally turns on its microphone and turns off its speaker.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A method of providing a cellular phone communication network for designated participating users, each user having a similarly equipped PDA/cell phone that includes a CPU, a GPS navigational system and a touch screen display:

establishing rapid voice call initiation and communication among the users of the cellular phone/PDA/GPS network system using a touch screen;

establishing within each cellular/PDA/GPS phone a software application program and database that permits each cell phone user to continuously know each other's geographical location and status which is displayed on the display touch screen of each cell phone;

displaying on each cell phone display one or more symbols representing the other users in the network having similarly equipped cell phones that transmit their geographical location upon request, time, distance traveled, or other criteria to the other users in the network periodically so that each cell phone user has a touch display with symbols representing the other users in the network geographically;

displaying a plurality of soft switches on each touch screen display of each cell phone in the user network that includes initiating a rapid voice call to any other user in the network through touching said first voice call switch after hooking a specific symbol or symbols that automatically calls the symbol(s) touched at the location(s), said database in each of said cell phone including the data link received, operator loaded or pre-loaded cell phone telephone number of each of the users and the phone numbers, URLs and E-mail addresses of fixed sites displayed in the network geographically and symbolically;

establishing a remote server for communicating with each cell phone;

transmitting and receiving messages including: voice, text photographs and video among all of the users in the network having a similarly equipped cell phone/PDA unit that includes messaging software;

establishing within each user's own cell phone a software program and soft switch display to preclude the detection of its use or its use by unauthorized users;

using a soft switch and the software accessed by said soft switch for turning off the transmitter of the user's own cell phone to prevent transmission of data and thereby deny the ability for non-authorized persons to detect the location of the network participant;

using a soft switch and the software accessed by the soft switch for destroying the display software of the user's own cell phone thus precluding non-authorized personnel from seeing the location of the other network participants while permitting continued tracking of the phone's location and optionally turning off the phone's speaker and turning on the phone's microphone so that conversations of personnel in the vicinity of the phone can be heard; and using a soft switch and the software accessed by the soft switch that causes destruction of the user's own cell phone message received location processing and display software thus precluding its use by others and optionally turning off its speaker and on its microphone so that the conversations of personnel in the vicinity can be heard.

2. A method as in claim 1, including the additional steps of:

using a soft switch and the software accessed by the soft switch, that causes a digital message to be sent to a remote cell phone disabling in each cell phone the remote phone's display thus precluding non-authorized personnel from seeing the location of the other network participants while permitting continued tracking of the phone's location and optionally turning off the phone's speaker and turning on the phone's microphone so that conversations of personnel in the vicinity of the phone can be heard; and using a soft switch and the software accessed by the soft switch that causes a digital message to be sent to the remote phone commanding destruction of the network participant's message receive location processing and display software thus precluding its use by others and optionally turning off its speaker and turning on its microphone thus permitting the monitoring of conversations in the vicinity of the microphone.

3. A cellular phone for use in a communication network for a plurality of participants comprising:

a cellular phone transmitter and receiver;

a small hand held portable housing containing said cellular phone transmitter and receiver;

a touch display screen mounted in said housing;

a modem connected to said cellular phone transmitter and receiver;

a CPU connected to said cellular phone transmitter and receiver;

a GPS navigation system connected to said CPU and to said cellular phone transmitter and receiver on said touch screen;

a database connected to said CPU that includes the symbol of a list of telephone numbers that relate to specific symbols;

a symbol generator connected to said CPU and said database for generating symbols on said touch screen, each of said symbols representing a participant in a communication network that has a cellular phone;

CPU software for selectively polling other participants with a cellular phone;

call initiating software connected through said CPU and said telephone database and said symbol generator whereby when a user touches the symbol displayed on a display screen the cellular phone call is automatically initiated to the cellular phone represented by the symbol;

a geographical database connected to said CPU to provide a geographical display on said touch screen representing a defined geographical area that also displays symbols representing each of the participants that has an identical cellular phone by latitude and longitude;

software application program connected to said CPU in each cell phone to control a remote cell phone including stopping transmissions from a remote cell phone; and software application program connected to said CPU in each cell phone including a corresponding soft switch that causes a digital message to be sent to a remote cell phone commanding destruction of the network participant's message received location processing and display software thus precluding its use by others.

4. A cell phone as in claim 3, including:

means for remotely turning off a remote cell phone speaker and turning on its microphone to permit monitoring of conversations in the vicinity of the remote microphone.

* * * * *